United States Patent
Numata et al.

(10) Patent No.: US 7,507,428 B2
(45) Date of Patent: Mar. 24, 2009

(54) NATURAL RED PIGMENT AND FOOD PRODUCT AND FOOD MATERIAL CONTAINING THE PIGMENT

(75) Inventors: Masahiro Numata, Moriya (JP); Junichi Wakamatsu, Moriya (JP)

(73) Assignee: Itoham Foods Inc., Kobe-shi (JP)

( * ) Notice: Subject to any disclaimer, the term of this patent is extended or adjusted under 35 U.S.C. 154(b) by 0 days.

(21) Appl. No.: 11/797,543

(22) Filed: May 4, 2007

(65) Prior Publication Data

US 2007/0212458 A1 Sep. 13, 2007

Related U.S. Application Data

(62) Division of application No. 10/503,338, filed as application No. PCT/JP03/00924 on Jan. 30, 2003, now abandoned.

(30) Foreign Application Priority Data

Feb. 1, 2002 (JP) .............................. 2002-025117
Jan. 24, 2003 (JP) .............................. 2003-015807

(51) Int. Cl.
 *A23B 4/023* (2006.01)
 *A23L 1/27* (2006.01)
 *C12C 5/04* (2006.01)
(52) U.S. Cl. ....................................... 426/264; 426/250
(58) Field of Classification Search ................. 426/250, 426/264
 See application file for complete search history.

(56) References Cited

U.S. PATENT DOCUMENTS 4,818,548 A * 4/1989 Cheng ......................... 426/265
2001/0033878 A1* 10/2001 Geppel et al. .................. 426/7

FOREIGN PATENT DOCUMENTS

| JP | 27-731 B | 2/1952 |
| JP | 10-014530 | 1/1998 |
| JP | 10014530 A * | 1/1998 |

OTHER PUBLICATIONS

Adamsen; *Organic meat processirig-non-nutrite alternatives to conventional meat curing*; The Royal Veterinary and Agricultural University, Frederksberg, Denmark.
Naomi R. Naito et al.; *Determination of the Hemoglobin Surface Domains that React with Cytochrome $b_5$*, Biochemistry, vol. 40, No. 7; American Chemical Society; pp. 2060-2065, Jan. 26, 2001.
International Search REport dated May 13, 2003 of PCT/JP03/00924.

* cited by examiner

*Primary Examiner*—Keith D Hendricks
*Assistant Examiner*—Jyoti Chawla
(74) *Attorney, Agent, or Firm*—Westerman, Hattori, Daniels & Adrian, LLP.

(57) ABSTRACT

The present inventors found that a natural red pigment can be obtained from hemoglobin and myoglobin whose metalloporphyrin moiety is zinc protoporphyrin, and made meat products, whale meat products, fish meat products and fish paste products that were colored with the natural red pigment. Consequently, it was possible to obtain food products stable to oxidation and exhibiting an excellent color tone without the need to use a color fixative, e.g. nitrite.

3 Claims, 4 Drawing Sheets

ZINC PROTOPORPHYRIN IX REAGENT

HEME EXTRACTED FROM MEAT HOMOGENATE

NATURAL RED PIGMENT AND FOOD PRODUCT AND FOOD MATERIAL CONTAINING THE PIGMENT

This application is a divisional of prior application Ser. No. 10/503,338 filed Aug. 2, 2004, which is a national stage of international application no. PCT/JP03/00924 filed on Jan. 30, 2003, the benefit of which is claimed under 35 U.S.C. §120.

TECHNICAL FIELD

The presefit invention relates to a natural red pigment that is stable to oxidation and exhibits an excellent color tone. The present invention also relates to food products and food materials that are colored with the natural red pigment. Further, the present invention relates to meat products, whale meat products, fish meat products and fish paste products wherein heme pigment existing in their raw meat materials has been converted to the above-described natural red pigment.

BACKGROUND ART

Examples of natural red pigments applicable to food products include red cabbage pigment extracted from red cabbage leaves, gardenia red pigment extracted from gardenia fruits, cochineal pigment extracted from cochineal insects, paprika pigment extracted from paprika fruits, beet red extracted from beet root, grape skin pigment extracted from grape skin, and monascus pigment extracted from microorganisms of the genus monascus. These pigments exhibit their own unique color tones but have mutual disadvantages. That is, the color tone may vary according to the pH, and some pigments lack stability to oxidation.

Similarly, heme pigment as the body of red pigment in meat and whale meat is unstable to oxidation and easily converted to the met form on heating, for example. One and only means for preventing conversion of heme pigment to the met form on heating is to coordinate nitrogen monoxide at the sixth coordination site of the heme central iron atom to thereby nitrosate the heme pigment. For this purpose, it is allowed to use a color fixative, e.g. sodium nitrite, which is a nitrogen monoxide supply source, in meat products and whale meat products. Nitrosated heme pigment is stable to oxidation even after it has been heated, and has an excellent color tone of pinkish red.

However, nitrite is a substance exhibiting very high reactivity, which oxidizes reducing substances and causes nitrosation, diazotization and deamination. Particularly, nitrosoamine formed by reaction of nitrite with secondary amine has strong carcinogenicity. Therefore, the use of nitrosoamine is regarded as questionable.

The present invention was made in view of the above-described circumstances, and an object of the present invention is to provide a natural red pigment stable to oxidation and exhibiting an excellent color tone and also provide food products and food materials that are colored with the natural red pigment. Another object of the present invention is to provide meat products, whale meat products, fish meat products and fish paste products that are stable to oxidation and exhibit an excellent color tone without the need to use a color fixative, e.g. nitrite.

DISCLOSURE OF INVENTION

The present inventors found that if the metalloporphyrin moiety of hemoglobin and myoglobin is zinc protoporphyrin IX complex, it is possible to provide a natural red pigment stable to oxidation and exhibiting an excellent color tone and also provide food products and food materials that are colored with the natural red pigment, and that it is possible to provide meat products, whale meat products, fish meat products and fish paste products that are stable to oxidation and exhibit an excellent color tone without the need to use a color fixative, e.g. nitrite, by converting heme pigment in these products to the above-described natural red pigment. The present inventors accomplished the present invention on the basis of this finding.

The natural red pigment according to the present invention has the following properties:

The absorption spectrum of a 0.1% aqueous solution of the natural red pigment in the wavelength range of from 650 nm to 350 nm shows absorption peaks at two wavelengths of 587 nm and 549 nm in the visible region and an absorption peak at a wavelength of 423 nm in the Soret band. The absorption spectrum of zinc protoporphyrin IX complex extracted from the above-described aqueous solution with HCL-added 2-butanone or 75% acetone shows absorption peaks at two wavelengths of 584 nm and 543 nm in the visible region and an absorption peak at a wavelength of 417 nm in the Soret band. A mass spectrometric analysis reveals the presence of a peak characteristic of zinc protoporphyrin IX complex at the position of m/e624.20.

The structure of the natural red pigment is as shown in FIG. 1. Zinc protoporphyrin is bound to globin at the fifth coordination site thereof to form zinc hemoglobin and zinc myoglobin. Zinc hemoglobin is fixed in the T (tense) state, regardless of whether it is in the oxy form or in the deoxy form. Therefore, a partially zinc-liganded hybrid hemoglobin [Zn(II), Fe(II)], for example, has heretofore been used for the studies of the interaction between the electron state of the heme central metal atom and the structure of protein molecule.

However, the idea of using zinc hemoglobin and zinc myoglobin for the purpose of coloring food products and food materials is not found in the prior art. Moreover, the fact that these pigments maintain an extremely stable color tone in food products and food materials was revealed for the first time in the present invention.

The proportion of the natural red pigment used in the present invention is preferably in the range of from 0.05% to 0.5% with respect to the weight of a food product or a food material. As a guide for adding the natural red pigment to obtain a desired color tone, addition of the pigment in an amount of 0.1% provides the color tone of oxyhemoglobin and oxymyoglobin of pork. If the amount of the natural red pigment added is 0.3%, the color tone of oxyhemoglobin and oxymyoglobin of beef is presented.

The present inventors also found that the central iron atom of normal heme pigment existing in meat, whale meat and fish meat is replaced with zinc by controlling the conditions of production carried out afterward, and the heme pigment after the zinc replacement is extremely stable to oxidation and to the change of pH and capable of maintaining the desired color tone. For example, if meat, whale meat, or fish meat is kept at 37° C. for 5 days, the central iron atom of heme pigment is replaced by zinc. The present invention was also the first to reveal the fact that a mechanism that replaces the central iron atom of heme pigment with zinc under certain conditions exists naturally in the muscle of meat, whale meat and fish meat.

The zinc replacement in meat, whale meat and fish meat depends on the pH. In the case of reaction at 37° C., the optimum pH is 5.5. As zinc necessary for the replacement, zinc existing in the muscle is utilized. However, if zinc gluconate or zinc acetate is added specially, the zinc replacement is promoted. In the present state where there is no zinc additive for general food products, addition of a food material containing a large amount of zinc, e.g. oyster meat extract, is effective. Further, the zinc replacement in meat, whale meat and fish meat is promoted by addition of a phosphate. Regarding food additives, addition of the following substances is effective: phosphoric acid, tripotassium phosphate, tricalcium phosphate, diammonium hydrogenphosphate, ammonium dihydrogenphosphate, dipotassium hydrogenphosphate, potassium dihydrogenphosphate, calcium monohydrogenphosphate, calcium dihydrogenphosphate, disodium hydrogenphosphate, sodium dihydrogenphosphate, trisodium phosphate, etc.

Meanwhile, the present inventors found that a zinc replacement mechanism exists also in heart, liver and so forth of meat, whale meat and fish meat and it exhibits an activity several times as high as that of muscle. The optimum temperature for reaction in liver is particularly high. If the reaction is allowed to take place at 55° C., the zinc replacement is completed in 3 hours. In this case, the optimum pH for the reaction shifts to 6.0.

The active fraction of liver exists in the liver microsome fraction. In fractionation by ultrafiltration, the active fraction of liver is a fraction having a molecular weight of not less than 200,000. If the microsome fraction is heated at 80° C. for 30 minutes, or if azide is added to the reaction system, zinc replacement does not take place. The active body is assumed to be an enzyme. It is also well possible to utilize a microorganism that produces a similar enzyme in place of liver.

BEST MODE FOR CARRYING OUT THE INVENTION

Examples of the present invention will be described below with reference to Tables 1 and 2 and the accompanying drawings for the purpose of describing the present invention more specifically.

EXAMPLE 1

Light Stability of the Pigment

Myoglobin (test section) having its metalloporphyrin moiety replaced with zinc protoporphyrin IX complex, oxymyoglobin (control section 1), and nitrosomyoglobin (control section 2) prepared by blowing nitrogen monoxide gas into myoglobin of reduced type were each dissolved in a 0.02 M phosphoric acid buffer solution (pH 5.5) at a concentration of 0.1% and subjected to a fading test for 1 week at 10° C. under fluorescent lighting at 2,500 lux. The degree of fading was expressed as the change in absorbance at a wavelength of 423 nm (Table 1).

TABLE 1

Table 1
Change in absorbance under fluorescent lighting

| Days of storage | Test Section | Control Section 1 | Control Section 2 |
|---|---|---|---|
| On zeroth day | 2.88 | 2.76 | 2.93 |
| On first day | 2.01 | 1.02 | 1.55 |
| On second day | 1.86 | 0.46 | 0.82 |
| On third day | 1.75 | — | 0.36 |
| On fourth day | 1.53 | — | — |
| On fifth day | 1.48 | — | — |
| On sixth day | 1.35 | — | — |
| On seventh day | 1.27 | — | — |

As shown in Table 1, the control sections 1 and 2 almost faded away on the third day and on the fourth day, respectively, whereas the test section faded at an extremely low rate and still maintained the red color tone even on the seventh day.

EXAMPLE 2 pH Stability of the Pigment

Figure 1:
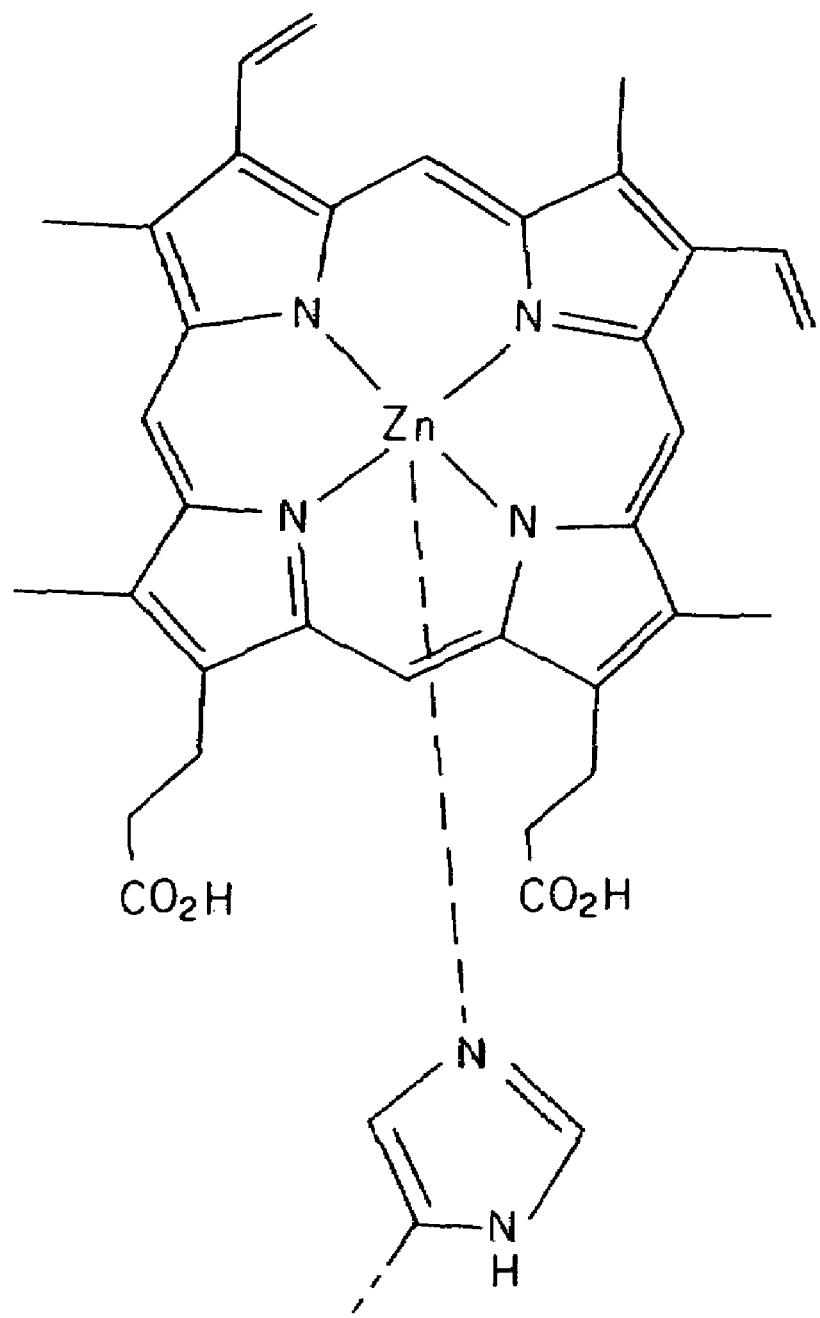
FIG. 1 is a diagram showing the site of binding of zinc protoporphyrin IX complex to a histidine residue in globin.
Figure 2:
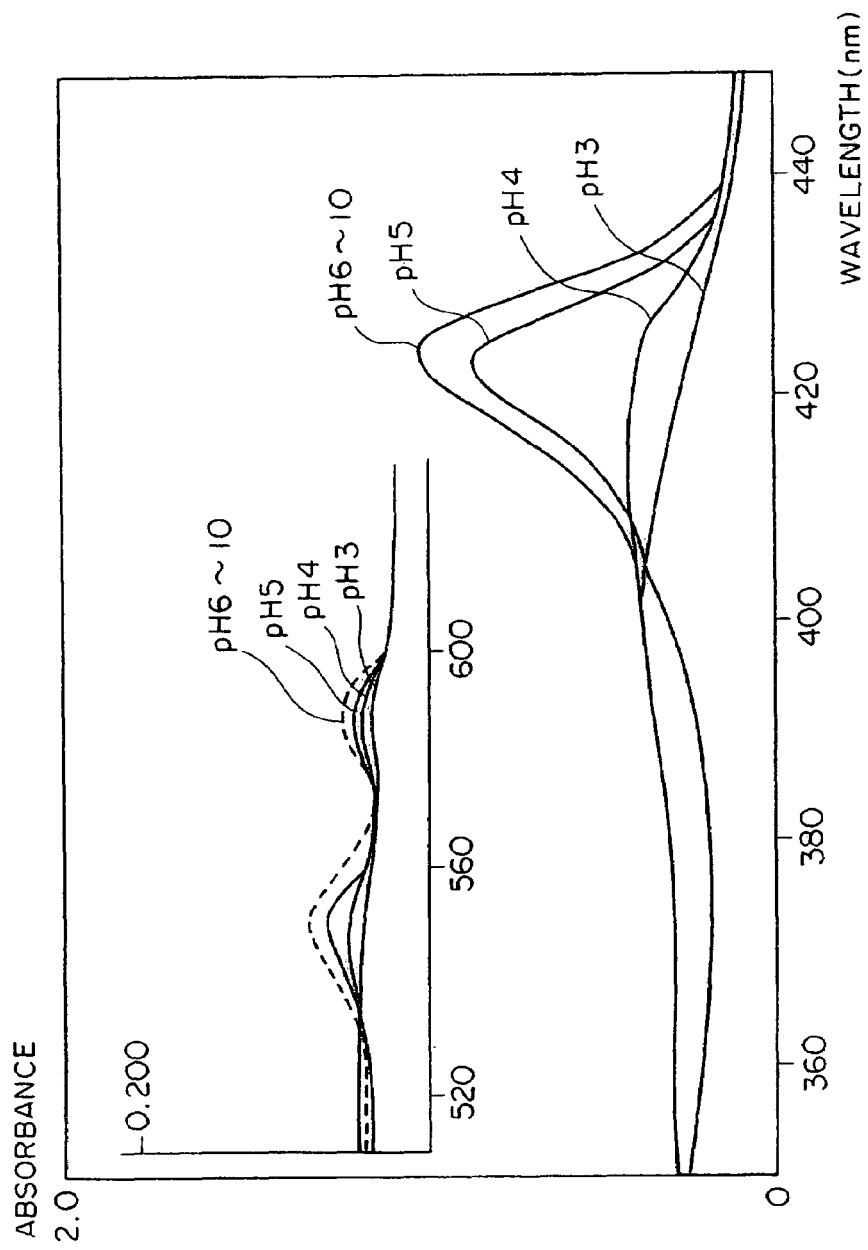
FIG. 2 is a diagram showing the effect of pH on the change of the absorption spectrum of zinc myoglobin.

The pH of each solution used in Example 1 was adjusted in the pH range of from 3.0 to 10.0 with 1 N hydrochloric acid or 1 N sodium hydroxide. Then, the absorption spectrum of each solution in the wavelength range of from 650 nm to 350 nm was measured. FIG. 2 shows the results of the measurement.

As shown in FIG. 2, the pigment of the test section was stable in the pH range of from 5.0 to 10.0, and substantially no change in the spectrum was observed. In the pH range of from 3.0 to 5.0, the pigment gradually precipitated. However, the precipitate maintained the red color tone. Meanwhile, the control sections 1 and 2 precipitated markedly at a pH of not more than 5.0, although not shown in the figure, and the precipitates had the color tone of metmyoglobin, i.e. dark brown.

EXAMPLE 3

Heat Stability of the Pigment

The solution of the test section used in Example 1 was heated at 70° C. for 30 minutes. The heating caused no change in the absorption spectrum of the 75%-acetone extract. Both the unheated solution and the heated solution exhibited absorption peaks characteristic of zinc protoporphyrin IX complex at wavelengths of 584 nm, 543 nm and 417 nm. The precipitate formed in the heated solution also maintained the bright red color tone.

EXAMPLE 4

Replacement of Heme Central Iron Atom in Pork Myoglobin by Zinc

Figure 3:
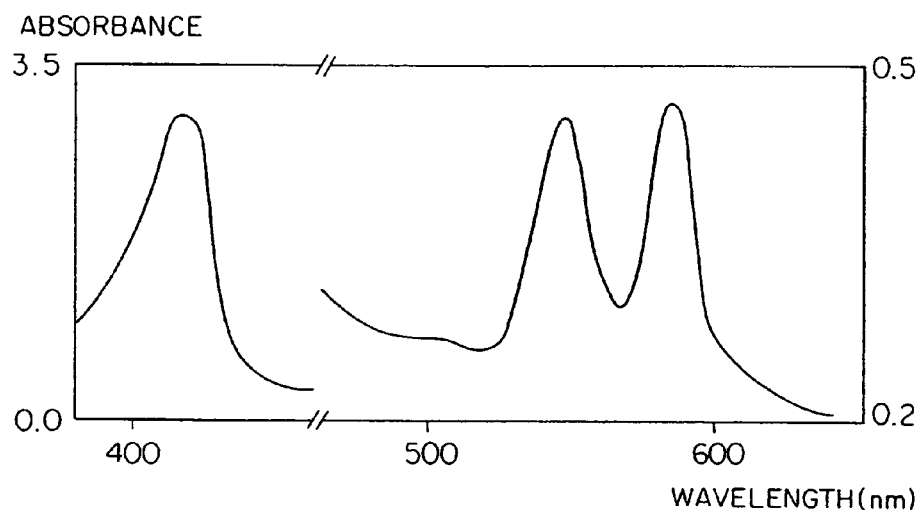
FIG. 3 is a diagram showing the absorption spectrum of heme extracted from a meat homogenate and that of a zinc protoporphyrin IX reagent.
Figure 3:
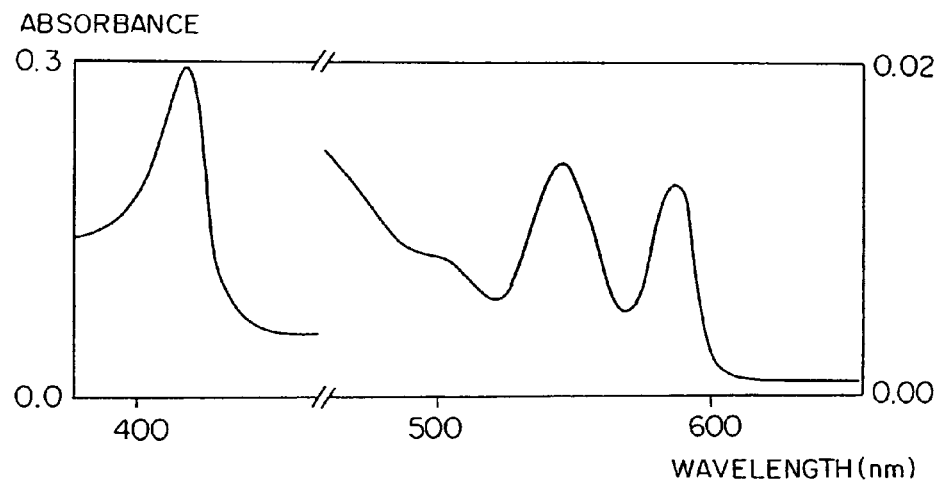
Figure 4:
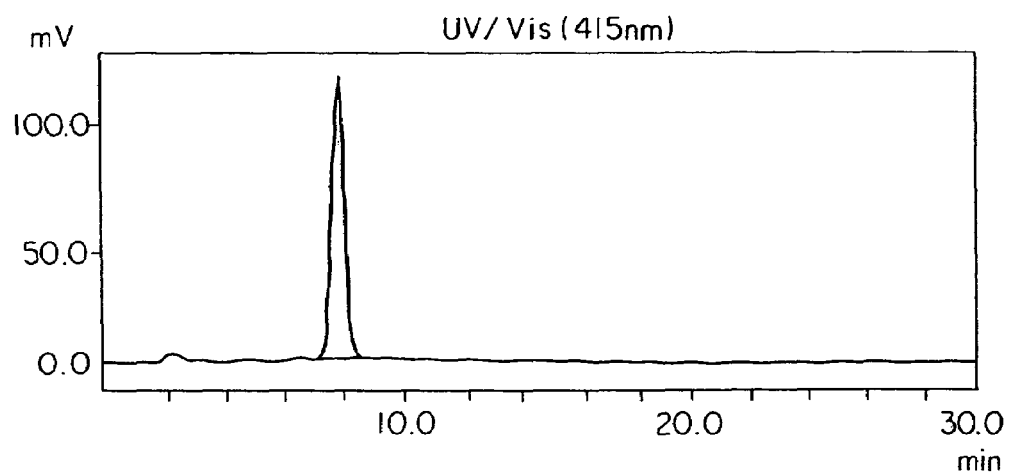
FIG. 4 is a diagram showing the HPLC pattern of heme extracted from a meat homogenate and that of a zinc protoporphyrin IX reagent.
Figure 4:
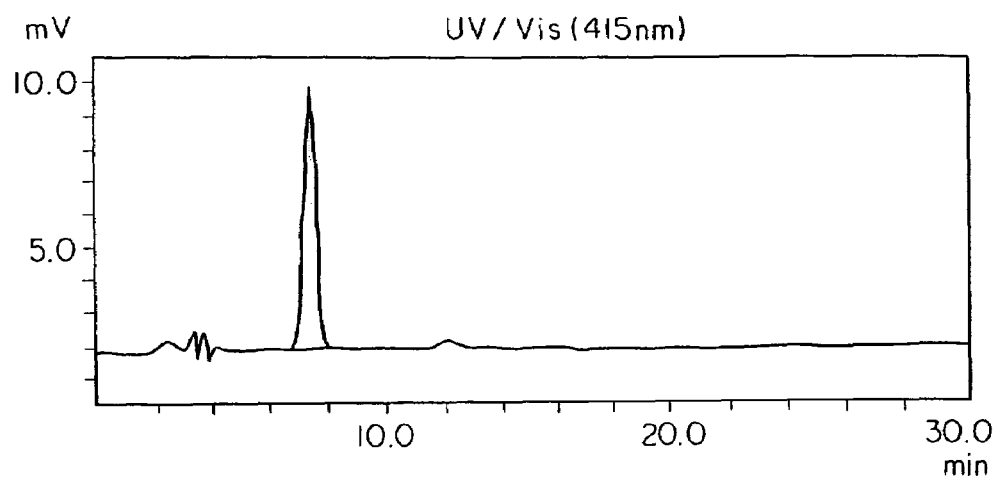

Pork loin meat from which fat and connective tissues had been removed as much as possible was minced. Thereafter, the minced meat was homogenized with a 0.2 M phosphoric acid buffer solution (pH 5.5) and then stored at 37° C. for 5 days. After the storage, heme was extracted with 75% acetone and then subjected to absorption spectrum analysis in the wavelength range of from 650 nm to 350 nm and also subjected to HPLC analysis to make a comparison with a zinc protoporphyrin IX reagent (available from Aldrich Chemical Company, Inc.). The HPLC conditions were as follows:

Column: Asahipak ODP-50 (4.6φ×150 mm)
Eluting solution: Methanol/0.01 M disodium phosphate (pH 9.0) (76:24)
Flow velocity: 0.5 ml/min
Detection: UV/VIS detection . . . 415 nm
    Fluorescence detection: Excitation: 415 nm
        Fluorescence: 590 nm The results of the measurement are shown in FIGS. 3 and 4. Both the absorption spectrum peak and the HPLC elution peak of the heme extracted from the meat homogenate coincided with those of the zinc protoporphyrin IX reagent.

EXAMPLE 5

Fading Test on Meat Homogenate

The homogenate of the pork loin meat prepared in Example 4 was filled in a polyethylene casing with a flat width of 20 mm and heated in a bath at 70° C. for 30 minutes. Thereafter, the meat homogenate was sliced to a thickness of 5 mm (test section). A control section was prepared as follows. The myoglobin in the meat homogenate was nitrosated by using 200 ppm of sodium nitrite and 0.2% sodium ascorbate. After being heated in the same way as the above, the meat homogenate was sliced to a thickness of 5 mm (control section). The fading test was carried out at 10° C. for 3 days under fluorescent lighting at 2,500 lux. The change in color tone during the test period was measured with a color difference meter (Color Tester, available from Suga Test Instruments) and expressed in the Hunter "a" value (Table 2).

TABLE 2

Table 2
Change in Hunter "a" value under fluorescent lighting

| Hours of storage | Test Section | Control Section |
| --- | --- | --- |
| At 0th hour | 6.86 | 7.12 |
| At 12th hour | 5.63 | 3.58 |
| At 24th hour | 4.81 | 1.89 |
| At 36th hour | 3.69 | — |
| At 48th hour | 3.08 | — |
| At 60th hour | 2.96 | — |
| At 72nd hour | 2.53 | — |

As shown in Table 2, the control section faded away completely at the 36th hour, whereas the test section faded at an extremely low rate and still maintained the red color tone even at the 72nd hour.

EXAMPLE 6

Preparation of Highly Concentrated Zinc Hemoglobin Solution

Pork heart from which fat and connective tissues had been removed as much as possible was minced. Thereafter, the minced meat was homogenized with a 0.2 M phosphoric acid buffer solution (pH 5.5) containing 10% pork hemoglobin and 0.01% zinc gluconate and then stored at 37° C. for 15 hours. After the storage, the absorption spectrum was measured by the method shown in Example 4. It was confirmed that the heme central iron atom in the added pork hemoglobin had been replaced by zinc.

EXAMPLE 7

Zinc Replacement of Pork Myoglobin by Pork Liver

Pork liver was homogenized with a 0.2 M phosphoric acid buffer solution (pH 6.0) added in an amount twice that of pork liver. Thereafter, the pork liver was further homogenized with 0.01% zinc gluconate, together with pork loin meat added in an amount equal to that of pork liver, and then stored at 55° C. for 3 hours. After the storage, the absorption spectrum was measured by the method shown in Example 4. It was confirmed that the heme central iron atom in the pork myoglobin in the reaction system had been replaced by zinc. Further, the homogenate after the storage was heated at 75° C. for 30 minutes. It was confirmed that the homogenate after the heating had an excellent color tone of pinkish red.

EXAMPLE 8

Making of a Novel Meat Product using Microsome Fraction of Pork Liver

Pork liver was homogenized with a pickle (containing 5% salt, 2% seasoning, and 0.5% spices; pH 7.0) added in an amount twice that of the pork liver. Thereafter, the pork liver was centrifuged at 10,000×g for 20 minutes. The centrifugal supernatant was injected into pork loin meat in an amount of 35% with respect to the meat. Thereafter, loin roll was produced according to the conventional procedure. Heating was carried out in a bath in the following sequence: 50° C. for 2 hours, 55° C. for 2 hours, and 72° C. for 1 hour. The heating was terminated when the center temperature reached 68° C. After the loin roll had been cooled overnight at 2° C., the absorption spectrum was measured by the method shown in Example 4. It was confirmed that the heme central iron atom in the myoglobin in the loin roll had been replaced by zinc. It was also confirmed that the loin roll had an excellent color tone of pinkish red.

As has been stated above, it is possible according to the present invention to provide a natural red pigment stable to oxidation and exhibiting an excellent color tone and also provide food products and food materials that are colored with the natural red pigment. It is also possible to provide meat products, whale meat products, fish meat products and fish paste products that are stable to oxidation and pH change and exhibit an excellent color tone without the need to use a color fixative, e.g. nitrite.

INDUSTRIAL APPLICABILITY

According to the present invention, hemoglobin and myoglobin existing in raw meat material convert to a natural red pigment. Therefore, the present invention is applicable to meat products, whale meat products, fish meat products, and fish paste products.

What is claimed is:

1. A method for producing meat products, whale meat products, fish meat products or fish paste products, comprising the steps of:
    providing a raw meat material including hemoglobin and myoglobin having metalloporphyrin moieties;
    providing a phosphoric acid buffer solution including zinc gluconate or zinc acetate, the phosphoric acid buffer solution having a pH value of 5.5 to 7.0;
    applying the raw meat material to the phosphoric acid buffer solution;

heating the buffered raw meat material at a temperature of 37° C. to 72° C. for a period of 1 hour to 5 days to convert the metalloporphyrin moieties into a red pigment of zinc protoporphyrin IX complex, wherein the meat products, whale meat products, fish meat products or fish paste products include the red pigment at an amount of 0.05 to 0.5% per weight of the raw meat material, wherein nitrite is not used in the steps.

2. A method according to claim 1, wherein the raw meat material is pork, wherein the phosphoric acid buffer solution includes zinc gluconate, wherein the phosphoric acid buffer solution has the pH value of 6.0, and wherein the pork is stored at 50° C.

3. A method according to claim 1, wherein the raw meat material is pork, wherein the phosphoric acid buffer has the pH value of 7.0, and wherein the pork is stored at 50 to 72° C., and wherein the step further comprises homogenizing the pork with a pickle.

* * * * *